3,175,912
SYNTHETIC ORGANIC CHEMICAL
PRESERVATIVE FOR BEER
Frede B. Strandskov, Verona, and John B. Bockelmann, Tenafly, N.J., assignors to F. & M. Schaefer Brewing Company, Brooklyn, N.Y.
No Drawing. Filed Aug. 11, 1961, Ser. No. 130,779
8 Claims. (Cl. 99—48)

The present invention relates generally to the control of micro-biological growth in finished packaged beer and ale with a synthetic, organic chemical preservative of the general formula:

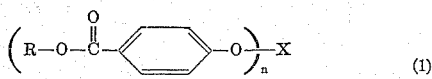

wherein R is an aliphatic hydrocarbon radical; X is either a hydrogen atom (H), an alkali metal, e.g., sodium (Na) and potassium (K), or an alkaline earth metal, e.g., calcium (Ca); and $n$ is an integer equal to the valence of X. More particularly, this invention is directed to the preservation of finished beer with a chemical preservative of the Formula 1 wherein R is saturated hydrocarbon chain. This invention also encompasses a mixture of compounds of Formula 1 as a chemical preservative for finished packaged beer and ale.

The chemical preservatives encompassed within the scope of this invention comprise: Those in which the number of carbon atoms in R is at least six and which require a concentration of at most 50 parts per million to be effective.

None of the contemplated preservatives of this invention adversely affects either the taste or the aroma of the finished product. The preferred preservative within the aforesaid group is the normal heptyl ester of para-hydroxybenzoic acid, which corresponds to the formula:

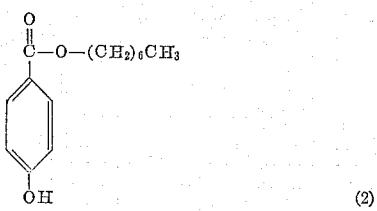

Synthetic organic chemical preservatives of Formula 1 are very effective; they are both fungistatic and bacteriostatic. Compounds corresponding to the Formula 1 therefore inhibit both the bacteria and the yeast growth in beer and ale and do not have to be used in combination with any other agent. This invention also relates to the finished product. All references to beer in the following disclosure apply equally well to ale. Encompassed within the scope of this invention are lager, porter and stout.

The preferred group of chemical preservatives contains in the hydrocarbon chain represented by the R in Formula 1, more particularly 7 carbon atoms.

The micro-biological spoilage of beer is a recognized problem (Kato, S., Nishikawa, N., and Munekata, H., "Bulletin of Brewing Science," published by the Brewing Scientific Research Institute, Tokyo, Japan, vol. 3, page 52, 1957). This is overcome by pasteurization of bottled and canned beer at the present time. Draught beer is not pasteurized and often spoils during the warm weather when left unrefrigerated. Said spoilage is readily observed by a marked amount of sediment in the beer and the unpleasant taste and odor produced by the microbial growth and metabolism.

Pasteurization of beer is a very costly and unpleasant operation. A typical modern pasteurizer for instance occupies approximately 900 square feet of floor space. The volume of steam used is large and the humidity caused by all the steam and hot water results in almost impossible working conditions during the hot summer months.

A further disadvantage of pasteurization is the temperature of the beer when it comes out of the pasteurizer. Although attempts are made to cool the beer, it is difficult to get the temperature below 90° F. Beer at this temperature ages rapidly and develops the undesirable age taste. Preservation with a synthetic organic chemical compound is accomplished without heat, allowing the beer to be packaged and shipped at about 32° F.; at this temperature practically no aging takes place. A further advantage of preservation with a chemical compound over that with pasteurization is the elimination of a considerable amount of bottle breakage and resulting loss of beer due to pressure generated in the bottle by high temperature. This loss amounts to as much as 0.5% of the total production.

In the preservation of beer with chemicals, it is appreciated that residual micro-organisms contained in said beer may and usually do include both yeasts and bacteria, thus necessitating the use of both a fungistatic chemical and a bacteriostatic chemical. The subject matter of the instant invention is directed to the employment of a single organic compound which is both fungistatic and bacteriostatic.

The prime purpose of the instant invention is to eliminate pasteurization. A further purpose is to preserve finished beer chemically, and more particularly to provide both fungistatic and bacteriostatic protection with a single chemical additament.

It is still a further purpose of this invention to provide a method for preserving finished beer, which method is as effective as pasteurization and yet is neither as costly nor as time-consuming as pasteurization.

The foregoing purposes apply with equal validity to the preservation of bock and lager beer and to ale irrespective of the packaging employed. The method of this invention can be employed for draught consumption as well as for consumption from bottles or cans.

Other and further objects of the present invention will appear from the more detailed description set forth below, it being understood that such detailed description is given by way of illustration and explanation only and not by way of limitation, since various changes therein may be made by those skilled in the art without departing from the scope of the present invention.

Esters of para-hydroxybenzoic acid and alkali metal and alkaline earth metal salts of said esters containing a hydrocarbon chain can be made up in stock solutions with a suitable solvent, such as ethyl alcohol, but preferably propylene glycol. The alkali metal and alkaline earth metal salts are most conveniently made up in stock aqueous solutions, i.e., water is the solvent. Such a stock solution can then be added to the finished beer to obtain therein an appropriate concentration of the preservative. It has been found that as little as 10 parts per million of the heptyl ester of para-hydroxybenzoic acid in finished beer results in essentially as good preservation over a period of up to 18 weeks as pasteurization of said finished beer. Parts per million are actually parts by weight of said heptyl ester per million parts by volume of finished beer. The inhibition of both bacteria and yeast growth in the beer is thus as great as that achieved by pasteurization over the period tested.

The effectiveness of the compounds of the instant invention as a beer preservative is evidenced by preparing a series of stock solutions in propylene glycol of the heptyl ester so that with the addition of at most 0.1 milliliter of any solution to a test bottle, the desired chemical preservative concentration is obtained when the test bottle (a clean, empty standard 12 ounce brown export bottle) is filled with unpasteurized beer and capped on the regular production line. The bottles are incubated at room temperature (about 75° F.) and are compared at weekly intervals with a pasteurized control for the development of sediment. The quantity of sediment is determined visually; values from 1 to 9, based on fixed sediment standards, being assigned to the various degrees of sediment formation. All of the tests are preferably run in triplicate.

The pasteurized beer which is used is free from all viable micro-organisms. The secondary yeast count in the unpasteurized beer is of the order of from 10 to 100 cells per milliliter, and the bacteria count is extremely low (a few per milliliter).

TABLE I

| Concentration of Heptyl Ester (p.p.m.) [1] | Sediment Formed After— | | | |
|---|---|---|---|---|
| | 6 Weeks | 8 Weeks | 12 Weeks | 18 Weeks |
| 0 | 9+–9+–9+ | 9+–9+–9+ | 9+–9+–9+ | 9+–9+–9+ |
| 1.0 | 9+–9+–9+ | 9+–9+–9+ | 9+–9+–9+ | 9+–9+–9+ |
| 2.0 | 4–9+–9+ | 9+–9+–9+ | 9+–9+–9+ | 9+–9+–9+ |
| 5.0 | 4–4–3 | 9+–9+–9+ | 9+–9+–9+ | 9+–9+–9+ |
| 10 | 3–3–3 | 2–3–3 | 3–4–3 | 5–4–5 |
| Pasteurized Control | 3–3–3 | 4–4–4 | 4–4–5 | 4–5–4 |

[1] Parts by weight of heptyl ester per million parts by volume of finished beer.

Employing the foregoing procedure, the data of Table I are obtained using as the preservative the normal heptyl ester of para-hydroxybenzoic acid. These data illustrate the degree of preservation both in relation to the pasteurized control and the unpasteurized sample to which no chemical was added.

It is generally accepted in the art that the hexyl and higher esters of para-hydroxybenzoic acid are no more active than the propyl and butyl esters of said acid. It is therefore completely unexpected that the heptyl ester displays the preservation illustrated in Table I in view of the lack of preservation possible at a similar concentration with either the propyl or butyl esters.

In the following examples and throughout the entire disclosure the relationship between parts by weight and parts by volume is the same as that between grams and milliliters; parts per million are uniformly parts by weight of preservative per million parts by volume of finished product.

*Example I*

Into a clean empty standard 12 ounce brown export bottle is placed 0.1 milliliter (ml.) of a propylene glycol solution of the normal heptyl ester of parahydroxybenzoic acid. The concentration of said acid (which is the chemical preservative) in the propylene glycol solution is 0.035 part by weight per part by volume.

The brown export bottle with the added chemical preservative is then filled with unpasteurized finished beer and capped on the regular production line. In this example, 350 milliliters of unpasteurized lager beer are placed in the bottle prior to capping. The concentration of preservative in the capped bottle is 10 parts (by weight) per million parts (by volume) of beer. This bottle of lager beer, maintained at room temperature (75° F.) for as long as 18 weeks, does not form an excess of sediment.

*Example II*

Into a clean empty standard 12 ounce brown export bottle is placed 0.1 milliliter of an ethyl alcohol solution of the normal heptyl ester of parahydroxybenzoic acid. The concentration of said ester (the chemical preservative) in the ethyl alcohol solution is 0.035 part by weight per part by volume.

The brown export bottle containing the added preservative is then filled with unpasteurized beer and capped on the regular production line. In this example 350 milliliters of unpasteurized porter beer are placed in the bottle prior to capping. The concentration of preservative in the capped bottle is 10 parts (by weight) of preservative per million parts (by volume) of unpasteurized beer. This bottle of porter beer (with added preservative), maintained at room temperature 75° F.) for as long as 18 weeks, does not form an excess of sediment.

In Examples 1 and 2, higher concentration of preservative can be employed with equal effect. Instead of normal heptyl ester, the octyl can be employed.

*Example III*

Into a clean standard half-barrel (about fifteen-and-one-half-gallon container) is placed 0.57 ounce of propylene glycol solution of the normal heptyl ester of parahydroxybenzoic acid. The concentration of said ester (the chemical preservative) is 0.035 part by weight per part by volume of propylene glycol solution.

The half-barrel containing the propylene glycol preservative solution is then filled with fifteen-and-one-half gallons of unpasteurized lager beer and sealed on the regular production line. The concentration of the chemical preservative in the sealed half-barrel is 10 parts (by weight) of preservative per million parts (by volume) of beer.

This half-barrel of beer (containing added preservative), maintained at a temperature of 75° F. for as long as 18 weeks, does not form an excessive amount of sediment.

All of the preceding examples have been directed to the use or normal heptyl ester of parahydroxybenzoic acid as the preservative. Repeating Example I with the same amount (0.1 ml.) of stock solution of normal esters of para-hydroxybenzoic acid, the concentration of the various esters in the stock solution and in the finished product to yield comparable preservation is reflected in Table II.

TABLE II

| Example | Normal Ester of Para-hydroxybenzoic Acid [1] | Concentration of Ester in Stock Solution (parts w./v.) [2] | Concentration of Ester in Finished Product (p.p.m.) |
|---|---|---|---|
| I | Heptyl | 0.035 | 10 |
| II | Octyl | 0.0175 | 5 |

[1] The use of corresponding alkali metal salts, such as the sodium salt and the potassium salt, or corresponding alkaline earth metal salts, such as the calcium salt, in aqueous stock solution results in the same preservation for each of the enumerated esters at the specified concentrations.
[2] The solvent for the stock solution may be any suitable solvent, such as propylene glycol and ethyl alcohol. When salts, such as alkali metal and alkaline earth metal salts, of the listed esters are employed, aqueous stock solutions are most conveniently used.

The foregoing are merely exemplary embodiments of the instant invention. Lager beer, bock beer, ale, porter and stout yield similar results when treated in the same manner. The invention may be effectively applied to beer which is packaged in ways other than those illustrated, e.g., canned beer. In any of the preceding examples the corresponding amounts (as indicated in Table II) of any alkali metal or alkaline earth metal salt are employed with equal preservative efficacy. Examples of these salts are compounds of the following formulae:

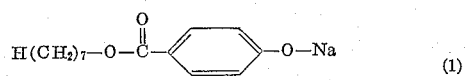

(1)

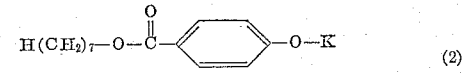

(2)

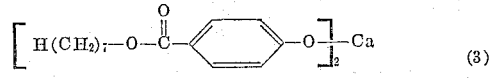

(3)

The alkali metal and alkaline earth metal salts may be used individually or in combination. A considerable advantage in using one or a combination of said salts is that an aqueous stock solution can be employed.

What we claim is:

1. Packaged finished beer containing a micro-biological growth inhibiting amount of heptyl ester of para-hydroxybenzoic acid.

2. The admixture of 10 parts by weight of the heptyl ester of para-hydroxybenzoic acid and one million parts by volume of packaged finished beer, the relationship between parts by weight and parts by volume being the same as that between grams and millimeters.

3. The admixture with finished beer of a micro-biological growth inhibiting amount of the heptyl ester of para-hydroxybenzoic acid, said ester being present in a concentration of from 10 parts per million to 50 parts per million.

4. Finished beer containing a micro-biological growth inhibiting amount of a compound of the formula

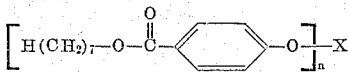

wherein X is a member selected from the group consisting of hydrogen, alkali metal and alkaline earth metal; and *n* is an integer equal to the valence of X.

5. Finished beer containing a micro-biological growth inhibiting amount of the sodium salt of the heptyl ester of para-hydroxybenzoic acid.

6. Finished beer containing a micro-biological growth inhibiting amount of the potassium salt of the heptyl ester of para-hydroxybenzoic acid.

7. Finished beer containing a micro-biological growth inhibiting amount of the calcium salt of the heptyl ester of para-hydroxybenzoic acid.

8. Finished beer containing a micro-biological growth inhibiting amount of a compound of the formula

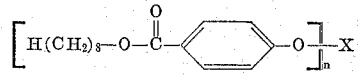

wherein X is a member selected from the group consisting of hydrogen, alkali metal and alkaline earth metal; and *n* is an integer equal to the valence of X.

References Cited by the Examiner
UNITED STATES PATENTS 2,842,441  7/58  Kuen _____ 99—48

OTHER REFERENCES

Antibiotics and Chemotherapy, vol. 7, 1957, pp. 29–36.

Chemical Abstracts, vol. 52, pp. 48–74(h)–4875(d), 1958.

Neidig et al.: Drug and Cosmetic Industry, vol. 54, No. 4, April 1, 1944, pp. 408–410, 481–489, 99–224 Lit.

Sabalitschka: Manufacturing Chemist, vol. 2, 1931, pp. 5 to 7.

A. LOUIS MONACELL, *Primary Examiner.*

TOBIAS E. LEVOW, ABRAHAM H. WINKELSTEIN,
*Examiners.*